United States Patent [19]

Marble

[11] 3,757,851

[45] Sept. 11, 1973

[54] AIR CONDITIONING CONVERTER ACCESSORY FOR MOTOR VEHICLES

[76] Inventor: Orlin G. Marble, 1216 S. Garfield, Alhambra, Calif.

[22] Filed: Sept. 3, 1971

[21] Appl. No.: 177,566

[52] U.S. Cl. ................................................. 165/41
[51] Int. Cl. ............................................. B60h 3/00
[58] Field of Search .................. 165/41, 42, 43, 80, 165/23; 98/2

[56] References Cited
UNITED STATES PATENTS

| | | | |
|---|---|---|---|
| 3,203,476 | 8/1965 | McMahan | 165/42 |
| 3,280,896 | 10/1966 | Goodson et al | 165/43 |
| 3,410,337 | 11/1968 | Priest | 165/41 |

*Primary Examiner*—Charles Sukalo
*Attorney*—W. D. Sellers et al.

[57] ABSTRACT

A converter accessory adapted to be readily installed between a vehicle air conditioner and one or more storage compartments for foods and beverages and operable at the option of a motorist to heat and to cool the contents of the compartment at the user's option. The accessory includes flexible hose and couplings by which the novice can connect the hose between the air distributor duct, the glove compartment and an insulated storage chest. Foodstuffs in the chest can be isolated from the air distributor while the accessory is in temporary use to warm a nursing bottle, or the like, using hot air supplied from the heater portion of the conditioner following which cooling can be resumed.

5 Claims, 4 Drawing Figures

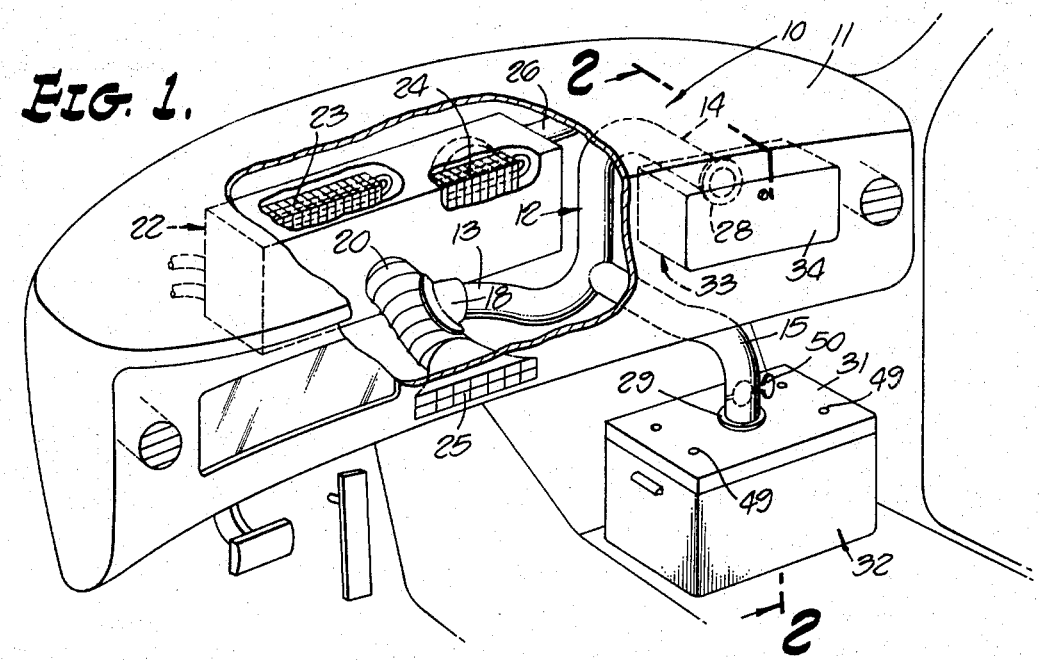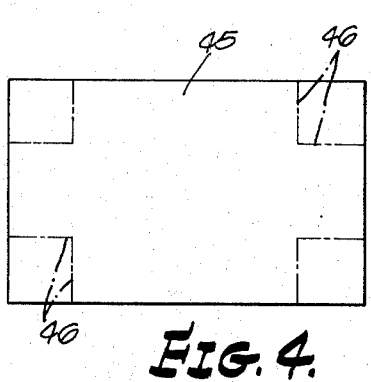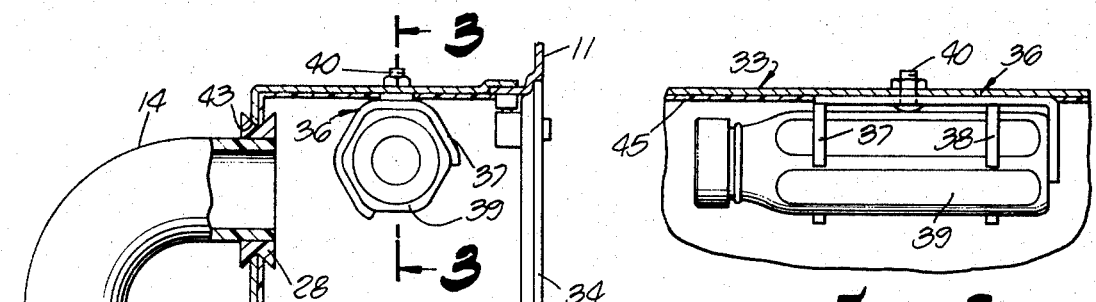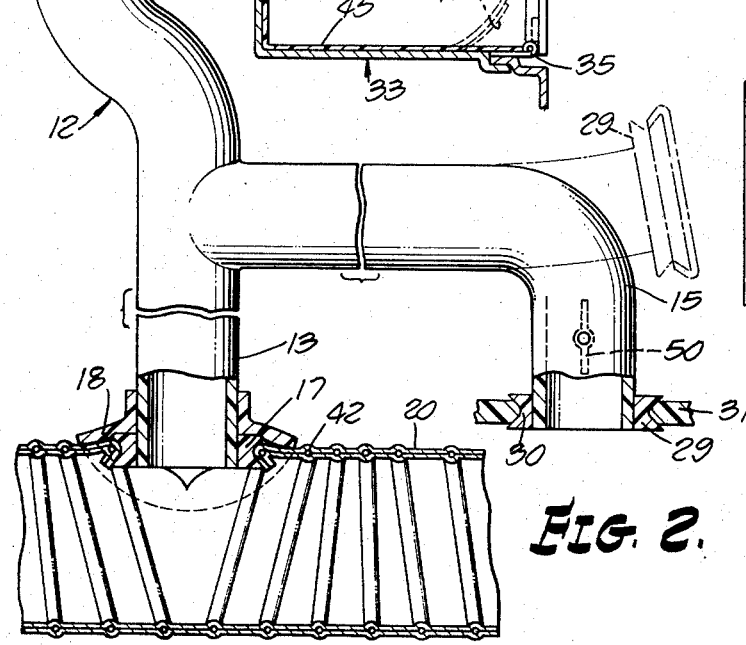
FIG. 1.
FIG. 2.
FIG. 3.
FIG. 4.
INVENTOR
ORLIN G. MARBLE
BY
ATTORNEYS

AIR CONDITIONING CONVERTER ACCESSORY FOR MOTOR VEHICLES

This invention relates to mobile air conditioning systems and more particularly to a method and a converter accessory readily installable by the novice between the air distributing duct of an auto air conditioner and one or more storage compartments and usable selectively to heat and to cool the contents of the compartment.

A major number of modern motor vehicles come equipped with air conditioners selectively operable to heat and to cool the vehicle but lack any provision for conditioning the contents of storage compartments suitable for storing foodstuffs and beverages. In consequence of this lack it has been common practice for motorists to place ice-cooled food storage chests in the vehicle trunk. Not only is ice not always conveniently obtainable, but the ice occupies considerable splace, limits the available space for foodstufs and melts creating a nuisance. Moreover, the closed trunk becomes highly heated from the sun rendering the practice most inefficient and undesirable.

Proposals have also been made for equipping the vehicle with a built-in connection between the cold air distributing duct and a storage compartment of the vehicle but these arrangements are needlessly complex, costly and difficult to service.

In view of the foregoing and other shortcomings of prior practice it is the purpose of this invention to provide a greatly simplified converter accessory readily installable by the novice or any mechanic in existing vehicles using simple tools and without need for disassembly of vehicle components. Typically, the converter accessory comprises a short length of flexible hose preferably having a branched outlet and equipped with simple adapter means at each end connectable into the vehicle air distributing duct with one branch end discharging into the vehicle glove compartment and another branch end connectable to an inlet of an insulated storage chest. The air distributing duct of the vehicle conditioner system typically has a helical wire core supporting its thin flexible walls. Such a duct is readily provided with an opening between adjacent convolutions of the wire helix and the helix is then easily expanded to receive the inlet end of the converter hose. The discharge ends of the hose branches include other adapters anchorable within an opening formed in the wall of the glove compartment and in the cover of the storage chest. A supply of foodstuffs and nursing bottles may be maintained refrigerated in the storage chest whereas the glove compartment includes a support for one of the nursing bottles located in the path of the incoming air and usable to heat the nursing bottle when the heating section of the air conditioner is activated. During this period a valve in the duct to the chest is closed and later opened to resume cooling of that compartment and its contents. By these simple expedients the motorist is provided with a heated and cooled supply of foods and beverages during prolonged travel periods without need for interrupting the journey or leaving the vehicle.

Accordingly, it is a primary object of the present invention to provide an improved method and converter accessories for providing a motorist with refrigerated foodstuffs and beverages utilizing capabilities of the vehicle heating and cooling system.

Another object of the invention is the provision of an improved technique for utilizing a vehicle heating and cooling system condition the vehicle glove compartment suitably to maintain a supply of hot or cold foodstuffs and beverages.

Another object of the invention is the provision of a simple converter accessory readily installable by the novice between a vehicle air conditioning system and one or more compartments for beverages and foodstuffs.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary perspective view with parts broken away showing an illustrative embodiment of the invention installed in a motor vehicle;

FIG. 2 is a cross sectional view on an enlarged scale taken along line 2—2 on FIG. 1;

FIG. 3 is a fragmentary view taken along line 3—3 on FIG. 2; and

FIG. 4 is a plan view of a plaque of insulating material for use in insulating the vehicle glove compartment.

Referring initially more particularly to FIG. 1, there is shown one preferred embodiment of the invention accessories, designated generally 10, installed beneath the cowl 11 of a motor vehicle. These accessories include a Y-shaped flexible hose 12 having an inlet end 13 and two outlet ends 14,15. The inlet end 13 is provided with an adapter including a sponge rubber collar 17 and a molded tubular flange fitting 18 each sized to have a firm seat when telescoped over the inlet end 13. As an incident to the assembly operation, both collar 17 and flange 18 may be bonded to the end of the hose and likewise the portion of the lower surface of flange 18 in contact with the air conditioner distributing duct 20 may be coated with mastic or adhesive to hold this fitting securely bonded to the adjacent surfaces of duct 20.

It will be understood that the vehicle is equipped with an air conditioning system 22, including a refrigerated heat exchanger 23 and a heating heat exchanger 24, both powered from the vehicle engine and usable selectively and optionally to supply hot and cold air to distributing duct 20. This duct opens through a grillwork 25 into the passenger compartment and has a return air inlet 26 leading through ducts, not shown, into the chamber enclosing heat exchangers 23,24.

Outlet 14 is provided with a spongy adapter collar 28 which may be bonded to the exterior of hose 12 after the latter has been cut to length to accommodate the positioning of the components in a particular vehicle. Likewise outlet branch 15 is provided with an adapter collar 29 readily insertable and anchorable in an opening 30 of cover 31 for the insulated storage chest 32. This chest may be mounted in any convenient location in the passenger compartment, such as on the floor beneath the glove compartment 33. The latter compartment is provided with an access door 34 mounted on hinges 35 in accordance with customary practice.

The converter accessory preferably includes a nursing bottle holder 36 (FIGS. 2 and 3) having C-shaped resilient fingers 37,38 releasably supporting a nursing bottle 39. Holder 36 is securable to the wall of compartment 33, as by the nut and bolt fastener 40. Desirably this holder is mounted in the upper portion of the compartment opposite the outlet of branch 14 thereby leaving the lower portion of the compartment available for the stowage of other items.

The installation of accessory 10 is a simple matter accomplished with a minimum of simple tools. The installer slits the sidewall of air distributor duct 20 with a sharp knife and cuts away a portion of the tubing large enough to receive the inlet tube 13 when adjacent convolutions of the wire core 42 are spread apart as indicated in FIG. 2. The spongy collar 17 is firmly gripped between adjacent convolutions of core wire 42 as the latter tend to resume their original close spacing. The molded flange coupling 18 is pressed firmly in place about the wall of the distributor duct and collar 17 after these surfaces have been liberally coated with mastic or other suitable adhesive. If desired, the duct may be wrapped with convolutions of tape overlying portions of flange fitting 18 to avoid any possibility of this adapter becoming loose or displaced from its installed position.

The rear wall of glove compartment 33 is customarily formed of heavy cardboard or sheet fiber and is easily cut to provide an opening 43 into which collar 28 can be inserted and anchored in place, as indicated in FIG. 2. Before this installation is made the interior of the compartment may be lined with a plaque of insulation material 45 as shown in FIG. 4. This plaque, as supplied is oversized to assure adequate material to fit different compartment sizes. The corners may be cut away as indicated by the dot and dash lines 46 to tailor the plaque for installation as a one piece lining. The rear surface of this lining is preferably coated with pressure sensitive adhesive 47 (FIG. 2) and a removable protective layer of wax paper which is peeled away immediately prior to installation of the lining in the compartment.

It will be understood that conventional glove compartments have an access cover 34 fitting loosely against cowl 11. This loose fit provides ample venting of air from the compartment in order that additional cooled air may enter through hose 12. Likewise cover 31 of storage chest 32 may be provided with vent openings 49 through which air can escape for the same purpose.

In use, a supply of nursing bottles charged with milk or other fluids, together with other foodstuffs, is placed in compartment 33 and in chest 32 with butterfly valve 50 in open position so that air can circulate to and through the chest. The motorist regulates air conditioner 22 to supply refrigerated air through hose 12 into both the glove compartment and chest. Meanwhile the outlets through cowl 11 into the passenger compartment may be opened or closed to suit the convenience of the passengers.

When it is desired to feed an infant passenger, a nursing bottle is removed from chest 32 and placed in holder 36 in the glove compartment. Valve 50 is then closed and the air conditioner is regulated in known manner to supply heated air into distributing duct 20 and then through hose 12 and outlet 14 into the glove compartment to heat the nursing bottle. This takes but a brief period after which valve 50 may be opened and the air conditioner adjusted to resume the supply of refrigerated air for distribution through hose 12. In this manner, a supply of food and beverages is maintained refrigerated at all times even though, during short intervals, cooling may be discontinued while the heating unit 24 is utilized to heat a nursing bottle. Neither of these operations interferes objectionably with the use of the air conditioner to cool the passenger compartment.

While the particular air conditioning converter accessory for motor vehicles herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That improvement in a motor vehicle having a cowl crosswise of the forward end of the passenger compartment and equipped with air heating and refrigerating means operatively connected to the vehicle engine and selectively operable to circulate heated and cooled air to a passenger compartment at the option of the passenger, a glove compartment mounted in said cowl having a loose-fitting access door, said improvement comprising: flexible hose means substantially concealed forwardly of said cowl and including airtight coupling means holding the inlet end thereof connected to an opening in the wall of said means for distributing heated and refrigerated air to the vehicle passenger compartment and airtight coupling means holding the discharge end thereof connected to an opening in said glove compartment in an area spaced from said access door thereby to convert said glove compartment into a storage compartment for food and beverages and adapted to be heated and refrigerated at the user's option by conditioned air circulated into said compartment through said flexible hose and vented into the passenger compartment past the edges of said loose fitting access door.

2. That improvement defined in claim 1 characterized in the provision of a layer of heat insulating material bonded to the walls of said glove compartment to minimize heat losses.

3. That improvement defined in claim 1 characterized in the provision of a plaque of heat insulating material having the corners thereof tailored as required for the remainder of said plaque to provide a substantially complete cover layer for the interior walls of said glove compartment, and a coating of pressure sensitive adhesive applied to one surface of said plaque and effective to hold said plaque bonded to the walls of said glove compartment.

4. That improvement defined in claim 1 characterized in the provision of resilient spring clip holder means attached to an interior wall of said glove compartment for supporting a nursing bottle in the path of air entering said glove compartment from the discharge end of said flexible hose and effective to refrigerate and to heat the contents of a nursing bottle mounted in said holder means dependent on whether refrigerated or heated air is being circulated therepast.

5. That improvement defined in claim 1 characterized in that said flexible hose includes two discharge ends one of which is connected to said glove compartment and the other of which is separably connected to an insulated food storage chest, valve means for one of said air discharge end operable to cut off the flow of hot air to said storage chest when it is desired to supply heated air to said glove compartment to heat the contents of a nursing bottle and operable to the open position of said valve means when it is desired to supply refrigerated air to both said chest and said glove compartment.

* * * * *